United States Patent [19]

Karpal

[11] E Patent Number: Re. 33,539

[45] Reissued Date of Patent: Feb. 19, 1991

[54] REFILLABLE CONTAINER WITH DEPRESSURIZATION MEANS

[76] Inventor: David Karpal, 461-204 Wellesley Dr., Corona, Calif. 91719

[21] Appl. No.: 272,525

[22] Filed: Nov. 17, 1988

Related U.S. Patent Documents

Reissue of:

[64] Patent No.: 4,623,076
Issued: Nov. 18, 1986
Appl. No.: 708,157
Filed: Mar. 4, 1985

[51] Int. Cl.[5] ..... B67D 3/00

[52] U.S. Cl. ..... 222/482; 222/542; 222/545; 222/562; 222/192; 220/367; 220/903

[58] Field of Search ..... 222/192, 396, 397, 478, 222/481, 482, 484, 542, 545, 562; 215/260; 220/367, 903

[56] References Cited

U.S. PATENT DOCUMENTS

| | | | |
|---|---|---|---|
| 2,542,741 | 2/1951 | Weidner | 215/260 |
| 2,990,079 | 6/1961 | Garvey | 220/367 X |
| 3,141,586 | 7/1964 | Wetlerek | 222/542 X |
| 3,473,682 | 10/1969 | Studen | 220/903 |
| 3,628,704 | 12/1971 | Corsette | 215/260 |
| 4,185,756 | 1/1980 | Sciamonte | 222/562 X |
| 4,534,391 | 8/1985 | Vertimiglia | 220/903 |
| 4,544,077 | 10/1985 | Rucker | 220/903 |

*Primary Examiner*—Joseph E. Valenza

*Assistant Examiner*—Steve Reiss

*Attorney, Agent, or Firm*—Bernard L. Kleinke; Jerry R. Potts; William Patrick Waters

[57] ABSTRACT

A venting type container to relieve pressurized carbonated liquids and the like without discharging the liquid therefrom while equalizing the interior container pressure with atmospheric pressure including a combination a flexible wall container for receiving the liquid and adapted to operatively receive a removable dispensing cap assembly which when brought into full threaded engagement with said dispensing cap assembly redefines the opening to said container; and a depressurization sealing unit which is operatively received on the dispensing cap assembly in sealing engagement to seal and contain the liquid within the container and define an interior cavity oriented between the dispensing cap assembly and the depressurization sealing unit. When the sealing relationship between the dispensing cap assembly and the depressurization sealing unit is initially broken a vent passage is defined which prevents the nongaseous contents of the container from escaping, but allows the gaseous contents to pass through vent holes and into the containment cavity between the dispensing cap assembly and the depressurization sealing assembly. Upon full removal of the depressurization sealing assembly the vent holes bring the interior of the container in continuous communication with the atmospheric pressure thereby preventing the collapse of the flexible wall container as liquid is extracted therefrom.

9 Claims, 2 Drawing Sheets

REFILLABLE CONTAINER WITH DEPRESSURIZATION MEANS

Matter enclosed in heavy brackets [ ] appears in the original patent but forms no part of this reissue specification; matter printed in italics indicates the additions made by reissue.

FIELD OF INVENTION

This invention relates to container closures, and in particular, to a closure assembly which is adaptable to either equalize the pressures interiorly of the container with those of the atmosphere to prevent the collapsing of the container or to vent a highly pressurized liquid within a sealed container to prevent the discharge of the liquid contained therein.

It has been long recognized that the build up of pressure in a closed container presents a definite hazard and a serious problem to the bottlers, manufacturers and retailers of chemically unstable products that tend to generate or liberate a gas. This is because at worst, an excessive build up of pressure within a closed container can result in serious and sudden container explosion and at least, can result in a sudden and rapid discharge of the nongaseous contents of the container as the interior of the container is brought into communication with the atmospheric air. This later problem is particularly true in opening conventionally bottled or canned carbonated beverages which have been severely agitated.

Conversely it has also been recognized, that there are other chemically unstable products that tend to absorb the oxygen from the air space within a closed container thereby creating a partial vacuum within the container which, unless equalized to the external atmosphere pressure, will tend to distort or collapse the container. A similar problem has also been recognized with extracting a liquid from a closed polyethylene container with a straw. Extraction by this method creates an internal vacuum causing the polyethylene container to collapse if its walls are not of sufficient thickness to withstand the pressure differentials.

In any case, the results due to conditions conducive to either the build up of excessive pressure or to the creation of a vacuum within a closed container are highly undesirable. And with the advent of bottles and containers formed of polyethylene and the like, the above mentioned difficulties are rendered even more undesirable.

Heretobefore, many efforts have been made for venting containers, to release excessive build up of pressures therein or to equalize a vacuum created within a closed container. Evidence of such efforts are found in the following prior art:

Vented Closure Assembly, Kitterman-U.S. Pat. No. 3,174,641

Vacuum Release Closure, Cassie et al.-U.S. Pat. No. 3,181,720

Vented Closure Container, Heisler-U.S. Pat. No. 3,189,210

Vented Closure Container, Starr, et al-U.S. Pat. No. 3,308,981

Plastic Cap Vented, McIntosh-U.S. Pat. No. 3,393,818

Container Closure, Fitzgerald-U.S. Pat. No. 3,635,380

Closure Means, Megowen, et al-U.S. Pat. No. 3,733,771

Drinking Receptacle, Albert-U.S. Pat. No. 3,967,748

Vented Closure Assembly, Nichioka, et al-U.S. Pat. No. 4,036,386

Self Vented Cap, Harrison, et al-U.S. Pat. No. 4,120,414

Container Depressurization, Malone-U.S. Pat. No. 4,231,489

Container Closure, Walter-U.S. Pat. No. 4,327,842

In each of these patents, venting of the container employs various sealing means to prevent the escape of the nongaseous fluid within the container while at the same time allowing the equalizing of interior and exterior atmospheric pressures with relation to the container. Further, the venting means evidenced by these patents had specific application to continuous venting systems only, there being no indication or teaching nor is it readily apparent therefrom that any of these known constructions are capable of relieving a high pressurized liquid without escape nor are they capable of contemporaneously equalizing a vacuum as liquid is extracted from a closed container.

Therefore an object of the present invention is to provide a seal or closure which is adaptable for releasing either a highly pressurized liquid within a closed container without discharging the liquid or equalizing a vacuum created within a sealed container so as to avoid collapsing the container.

Another object of this invention is to provide a seal or closure assembly which contains a highly pressurized liquid to be instantaneously relieved of pressure without discharging the liquid therefrom.

Another object of this invention is to provide a relatively simple container structure, relatively inexpensive to manufacture, and adaptable to storage of either cold or hot liquids without rapid loss of thermal energy and which may be refilled and used repeatedly.

Other features and advantages will become more readily apparent when considered in view of the drawing and description in which.

Figure 1:
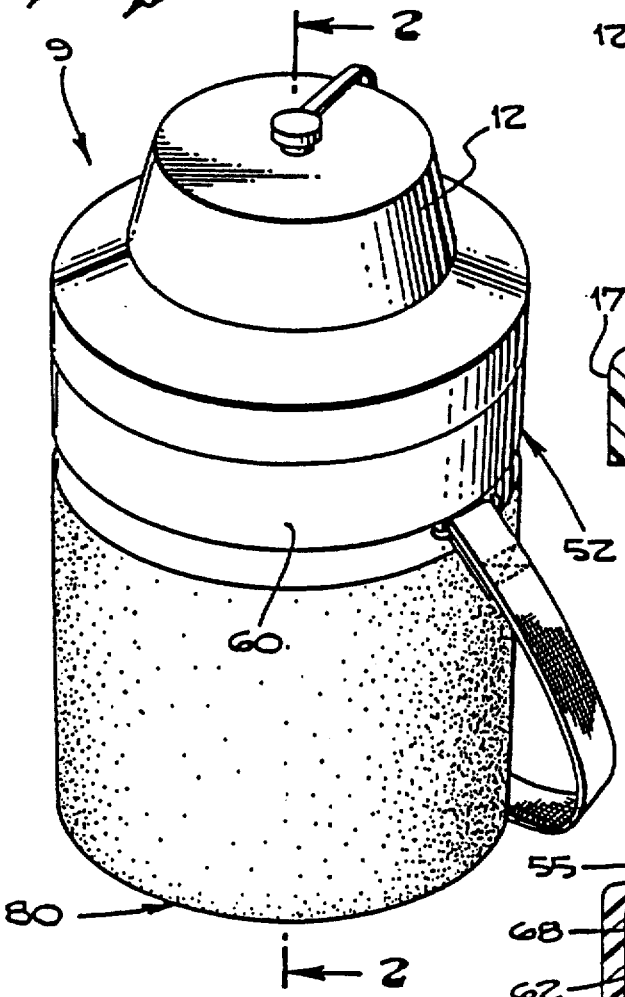
FIG. 1 is a view of a bottle type container and closure therefore in accordance with this invention.
Figure 5:
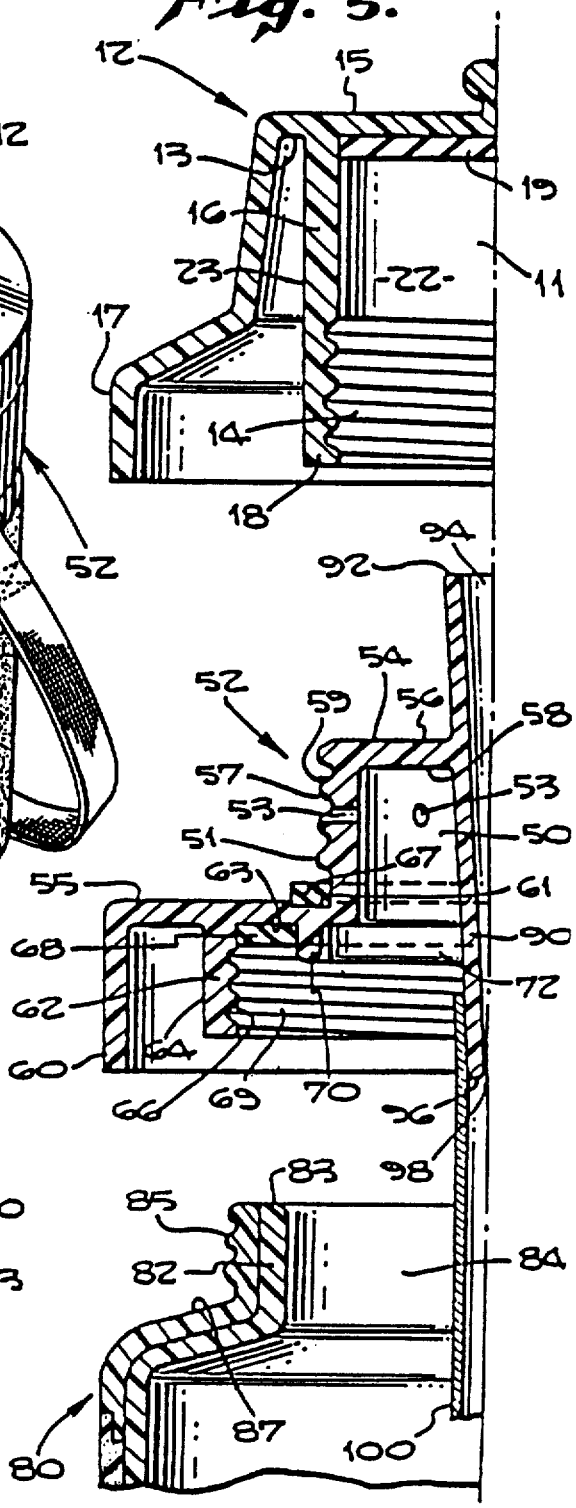
FIG. 5 is an exploded sectional view showing the depressurization sealing assembly; the dispensing valve assembly; and the plastic bottle.
Figure 4:
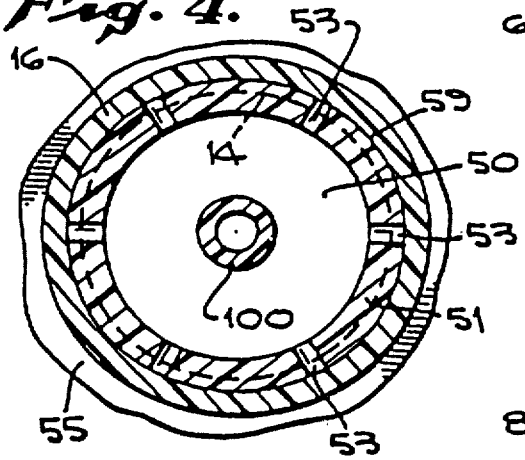
FIG. 4 is a sectional view taken along line 4—4 of FIG. 2.
Figures 2, 3:
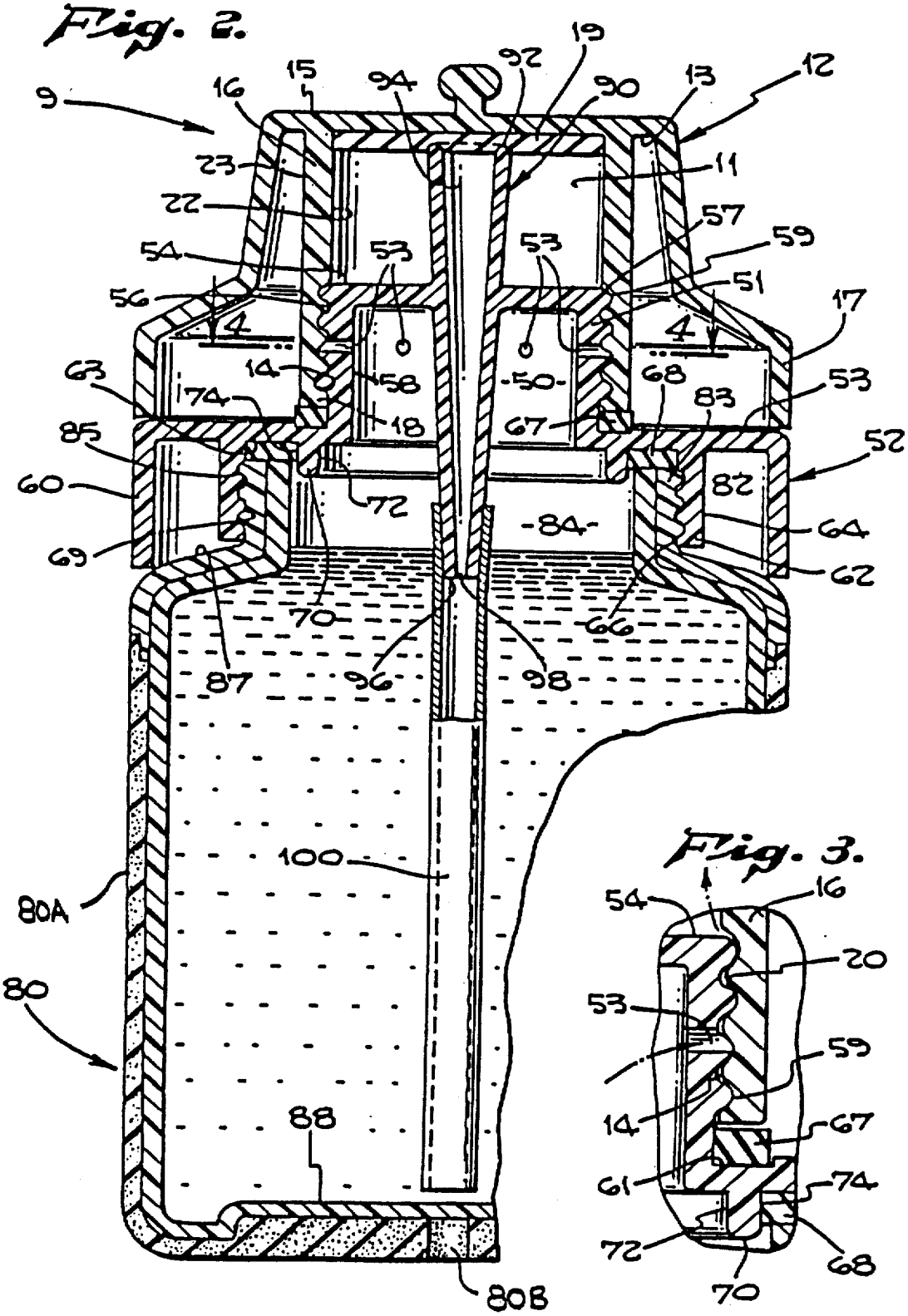
FIG. 2 is a sectional view taken along line 2—2 of FIG. 1.
FIG. 3 is a fragmentary detail of FIG. 2.

In the drawings, the numeral 9 designates generally a container made of any suitable elastomeric material of a chemically inert nature, such as polyethylene. The container includes, as its primary components, a depressurization sealing assembly 12, dispensing cap assembly 52 which is received within the depressurization sealing assembly 12, and a plastic bottle 80 [formed of polyethylene or the like ] *, said bottle 80 having a sleeve surrounding the lower portion thereof and* having *a sleeve 80A so the container structure is adaptable to storage of either cold or hot liquids without rapid loss of thermal energy. The sleeve includes a hole 80B that is centrally disposed in the bottom portion of the sleeve. The bottle 80 includes* a reduced neck portion 82 terminating in a lip 83 which defines the opening or mouth 84 thereof. Formed about the outer neck of the bottle are threads 85 by which the dispensing cap assembly 52 may be threaded thereto for closing the opening 84. The dispensing cap assembly 52 has a top 54, the top 54 having an outer surface 56 and an inner surface 58. The inner surface 58 of the dispensing cap assembly 52 includes an outer depending continuous, preferably annular skirt 60, an inner depending, continuous, preferably annular skirt 62, and an inner depending, continuous, preferably annular lip 70, which lip has an inner surface 72, and an outer surface 74. The annular skirt 62 has an outer surface 64 and an inner surface 66, the inner surface being provided with a continuous, helical thread 69 which is engageable with the threads 85 provided upon the exterior surface 87 of the neck of the bottle 80 to which the dispensing cap assembly 52 is to be secured. An annular groove 63 is formed between the annular lip 70 and the threaded surface of the annular skirt 62 in which a bottle gasket seal 68, preferably in the form of an O-ring is disposed.

The outer surface 56 of the dispensing cap assembly 52 is provided with a depending, integrally formed annular spout 90 extending generally upward from the outer surface 56 of the top 54 and the generally downward from the inner surface 58 of the top 54. Preferably the upward extension of the annular spout 90 will taper radially outward to an upper lip 92, which defines the upper opening of the spout 94, while the downward extension of the annular spout 90 will taper radially inward to a lower lip 96, which defines the lower opening 98 of the spout 90. The lower opening 98 of the spout is of sufficient diameter to resiliently engage the inner surface of a standard disposable drinking straw 100 so as to form an extended passage from the upper opening 94 of the spout 90 to a point slightly above the bottom surface 88 of the bottle 80 when the dispensing cap assembly 52 is secured to the bottle 80.

The outer surface 56 of the dispensing cap assembly 52 further includes a depending integrally formed cylindrical boss 51 formed substantially centrally of the outer surface 56 of the dispensing cap assembly 52 and extending upwardly from the seat 55 of the dispensing cap assembly 52, said seat having a recessed annular groove 61. The boss 51 being substantially cylindrical in configuration in the embodiment of the invention chosen for illustration and having a central torodial type cavity 50 which is provided for the purpose of retaining the liquid from the container's vented carbonated gas bubbles. As illustrated, the cavity 50 of the boss 51 is vented at its sidewalls by a plurality of vent holes 53 which are provided for the purpose of allowing the equalization of pressures for the bottle 80.

The outer sidewall surface 57 of the boss 51 is provided with a continuous helical thread 59 which is engageable with the threads 14 provided upon the inner annular skirt 16 of the depressurization sealing assembly 12. An annular groove 61 is formed between the base of the threaded surface of the cylindrical boss 51 and the recessed surface of the seat 55 in which a vent gasket seal 67, preferably in the form of an O-ring, is disposed.

The depressurization sealing assembly 12, formed from a relatively hard plastic material, has an inner surface 13 and an outer surface 15. The inner surface 13 of the depressurization sealing assembly 12 includes an outer depending, continuous, preferably annular skirt 17, and an inner depending, continuous, preferably annular skirt 16, which skirt 16, has a lip 18, an inner surface 22 and an outer surface 23. The inner surface 22 of the skirt 16 is provided with a continuous helical thread 14 which is engageable with the threads 59 on the outer sidewall surface 57 of the boss 51 to which the depressurization sealing assembly 12 is to be secured. As illustrated, the inner surfaces 22 of the annular skirt 16 form a sealed cavity 11 as the depressurization sealing assembly 12 is screwed sufficiently tight so that a fluid seal is formed between the vent gasket seal 67 and the lip 18 of the annular skirt 16. As further illustrated, a spout gasket 19 can be received within the inner surface cavity of the skirt 16 to seal the opening of the spout 94 as the depressurization sealing assembly 12 is screwed sufficiently tight to the dispensing cap assembly 52.

It will be understood from the foregoing description of the parts, that when the dispensing cap assembly 52 is secured to the bottle 80 the liquid and gas within the bottle will be able to readily escape through the vent holes 53 and spout 90. Accordingly, as liquid is extracted through the spout 90, the vacuum created thereby is immediately dissipated as the atmosphere on the interior of the bottle 80 is brought into communication with the atmospheric air through the vent holes 53. Under this arrangement bottle collapse will be avoided.

It will be further understood that when the depressurization sealing assembly 12 is secured to the boss 51 of the dispensing cap assembly 52 the liquid and gas within the bottle 80 will not be able to escape. It is, of course, desirable that the contents of the container not be allowed to pass therefrom and, to this end, the continuous thread 14 of the annular skirt 16 blocks the vent holes 53 when the depressurization sealing assembly 12 is screwed tightly to the boss 51 of the dispensing cap assembly 52. Similarly the spout gasket 19 provides a seal between the interior walls of cavity 11 and the lip 92 of the spout 90 thereby preventing the passage of liquid and gas into cavity 11.

As the depressurization sealing assembly 12 is initially loosened to remove it from the boss 51 the continuous thread 14 defines a canal 20 whereby the interior of the bottle 80 is placed in communication with the interior atmosphere of cavity 11 by allowing air to pass along canal 20 and to a point adjacent the inner surface 22 of the depressurization sealing assembly 12 and, more particularly into cavity 11. As illustrated, the carbonated gas bubbles will be drawn into the torodial type cavity 50 and will burst as they are pulled through the vent holes 53. The liquid carried by such bubbles, however, will be retained in the cavity 50. Once the gas has been vented into the interior of cavity 11 the depressurization sealing assembly 12 may be sufficiently loosened to release the seal between the spout lip 92 and the spout gasket 19 and the seal between lip 18 of inner annular skirt 16 and the vent gasket 63 and thereby the interior of cavity 11 is placed in complete communication with the atmospheric air without discharging the liquid in the bottle 80.

Thus, it is seen that there is provided a closure assembly for the container which not only allows vacuums created by extracting liquids therefrom to be immediately dissipated by allowing the free passage of air into the container as such is needed to equalize pressure conditions therein, but also allows the dissipation of any pressure build-up without discharging the nongaseous contents.

What is claimed is:

1. A venting type container, to relieve *pressure of* pressurized carbonated liquids and the like therefrom without discharging said liquid while equalizing interior container pressure with atmospheric pressure, comprising:

a flexible wall [container] *bottle* having a threaded neck portion terminating in a circumferential lip defining an opening to said [container] *bottle;* a removable dispensing cap [for said container] having [: an integrally formed] *a* dispensing spout terminating in a circumferential lip defining an opening to said spout; an [integrally formed] externally threaded boss [having an external and internal surface] defining a [central torodial] *centrally disposed* type cavity with a plurality of vent holes; and an [integrally formed] internally threaded annular cap skirt for engaging the threads on said [container] *bottle*, whereby the opening to said [container] *bottle* is redefined by said vent holes and *said* spout opening as said dispensing cap is brought into full threaded engagement with said [container] *bottle*; and a depressurization sealing assembly having [: an integral] *a* internally threaded annular assembly skirt for engaging the external threads on said boss, said annular skirt terminating in a circumferential lip defining an open internal cavity within said sealing assembly; [an insert gasket received within the top of said cavity whereby] *said depressurization sealing assembly causing* the opening to said spout [is] *to be* sealed as said sealing assembly is brought into full threaded engagement on said boss [; and a lip gasket received on said lip whereby] *and causing* the opening to said cavity [is] *to be* sealed as said sealing assembly is brought into full threaded engagement with said boss, whereby the orientation of said depressurization sealing assembly in relation to said dispensing cap assembly permits gases and not liquid within [said] *the* container to vent from inside out or from outside into the container through said vent holes depending on the relative pressures within and without [said] *the* container.

2. The invention as defined in claim 1, wherein said depressurization sealing assembly further comprises an annular outer skirt spaced radially outward from said assembly skirt.

3. The invention as defined in claim 1, wherein said dispensing cap further comprises a top having an outer and inner surface, said inner surface having an outer depending annular skirt spaced radially outward from said cap skirt, and an inner depending annular lip, spaced radially inward from said cap skirt, with an inner surface and an outer surface.

4. The dispensing cap as defined in claim 3, wherein said cap skirt and said lip comprise an annular groove wherein a seal is disposed.

5. The dispensing cap as defined in claim 3, wherein said spout extends generally upward from said outer surface of said top and generally downward from the inner surface of said top; said upward extension of said spout tapers radially outward to a circumferential lip defining an upper opening to said spout; said downward extension of said spout tapers radially inward to a circumferential lip defining a lower opening to said spout.

6. The dispensing cap as defined in claim 3, wherein said boss extends generally upward from the outer surface of said top, and is disposed substantially centrally of the outer surface of said top.

*7. A venting type container as recited in claim 1 wherein said bottle includes a sleeve.*

*8. A venting type container as recited in claim 7 wherein said sleeve includes means defining an aperture disposed centrally in the bottom portion thereof.*

*9. A venting type container as recited in claim 1, wherein said bottle is composed of elastomeric material.*

* * * * *

UNITED STATES PATENT AND TRADEMARK OFFICE

CERTIFICATE OF CORRECTION

PATENT NO. : Re. 33,539

DATED : February 19, 1991

INVENTOR(S) : David Karpal

It is certified that error appears in the above-identified patent and that said Letters Patent is hereby corrected as shown below:

Column 1, line 52, delete "Heretobefore", and substitute therefor --Heretofore--.

Signed and Sealed this

Twenty-first Day of September, 1993

Bruce Lehman

*Attest:*

BRUCE LEHMAN

*Attesting Officer*

*Commissioner of Patents and Trademarks*